ANALOGUE TO BINARY CONVERSION APPARATUS

Filed Dec. 21, 1961 2 Sheets-Sheet 1

INVENTOR
GENUNG L. CLAPPER
BY William N. Barret, Jr.
ATTORNEY

United States Patent Office 3,193,668
Patented July 6, 1965

3,193,668
ANALOGUE TO BINARY CONVERSION APPARATUS

Genung L. Clapper, Vestal, N.Y., assignor to International Business Machines Corporation, New York, N.Y., a corporation of New York
Filed Dec. 21, 1961, Ser. No. 161,183
2 Claims. (Cl. 235—154)

The present invention relates to an analogue to binary conversion apparatus.

An analogue quantity is one wherein the magnitude at any given time is an undivided scalar quantity. A digital quantity is one wherein the magnitude at any given time is measured by the number of discrete units contained in said quantity. A digital quantity may be represented expressed in any radix system. A binary number is a number in the radix two system as follows:

$$A_0 2^0 + A_1 2^1 + A_2 2^2 + A_3 2^3 + \ldots A_n 2^n$$

where the constant A is 0 or 1.

There have been many analogue to digital conversion apparatuses in the past, and these have generally taken the form of a series of voltage responsive devices in which the analogue quantity determines the voltage responsive devices which will conduct. The outputs of these devices being digital in nature, they may be logically converted into a binary number.

Other systems have been developed in which an analogue input quantity has been converted to a binary number directly by successively attempting to subtract analogue quantities from this input. These analogue quantities are made proportional to the magnitude of the order of the binary quantity into which the input is to be converted. For each possible subtraction, a binary "1" is indicated for that particular order of the binary series. If no subtraction is possible, a binary "0" is recorded.

Both of these above types of conversion apparatus take large quantities of equipment and as to the second are complicated and difficult to adjust and keep accurate.

The present invention presents a concept by which an analogue voltage is converted to a binary number in a simple and reliable manner. In essence a series of voltage responsive devices representing binary orders are provided which are each responsive to a predetermined input analogue voltage. However, each voltage responsive device is also controlled by the higher order devices to be responsive to different magnitudes of input signals in dependence upon the magnitude of the signal at that time.

With this concept of controlling the voltage responsive devices to vary the voltage to which they are responsive in dependence on the higher order stages, it is simple to make a transformation from analogue to binary wherein the transformation may be arithmetic (linear), geometric or logarithmic by choosing suitable voltages.

It is therefore an object of the present invention to provide an improved analogue to binary conversion apparatus.

It is a further object of the present invention to provide an analogue to binary conversion apparatus wherein the binary output may be any function of the input analogue.

Still another object of the present invention is to provide an analogue to binary conversion apparatus wherein the circuitry is solid state and not unduly subject to voltage variations.

The foregoing and other objects, features and advantages of the invention will be apparent from the following more particular description of a preferred embodiment of the invention, as illustrated in the accompanying drawings.

Figure 1:
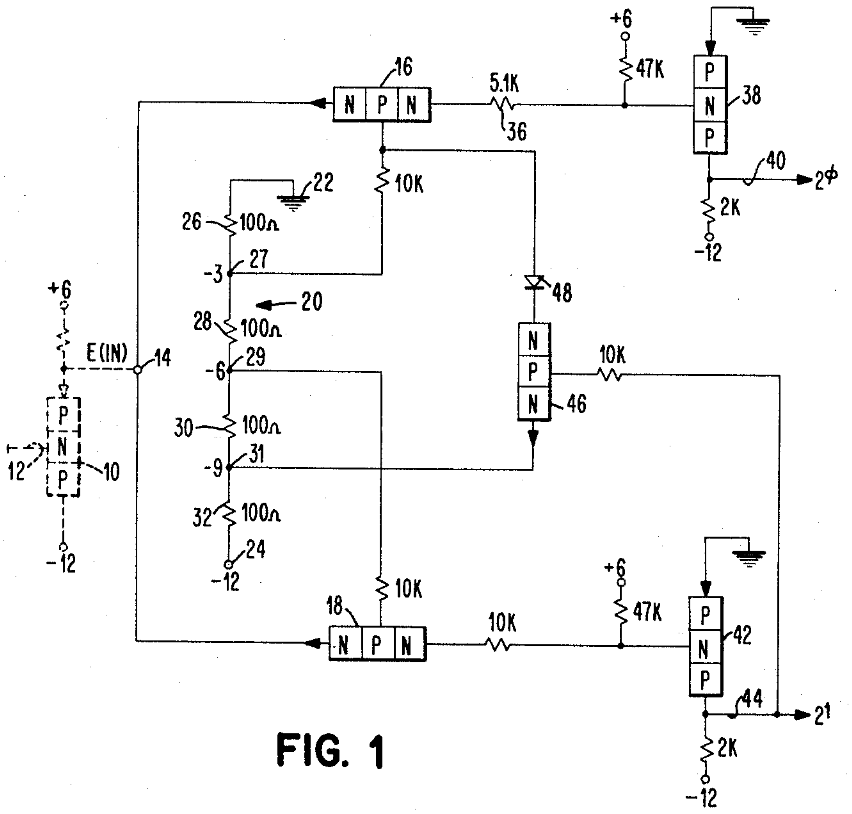
FIG. 1 is a circuit diagram of the basic concept of the invention.
Figure 2:
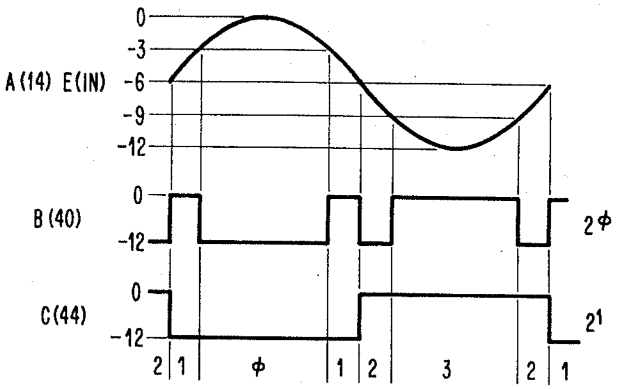
FIG. 2 is a chart of waveforms with particular reference to FIG. 1.

Referring particularly to FIG. 2 and the waveform being analyzed by FIG. 1, it will be noted that the waveform, line A, varies between 0 and −12 volts. This, it should be particularly pointed out, is in reference to the examples shown therein. However, whether the voltages are plus or minus or a combination of the same is immaterial to the inventive concept. Line B, FIG. 2, is indicative of the binary output $2^0$ which in binary form is the lowest place of the binary number. Line C, FIG. 2, indicates the second highest order of the binary number $2^1$.

At the bottom of FIG. 2 across the X axis are a series of numbers which indicate in decimal form the magnitude of the binary number indicated by the waveforms shown on lines B and C. In lines B and C a binary 1 indication is given when the output is at the raised voltage level of 0 volts, while a 0 is indicated by the −12 volts.

In this instance when the A.C. wave, line A, is shown passing between −6 volts and −9 volts, decimal indication 2, the pulse, line C, is at the raised level, while the pulse, line B, is at the low level.

As the A.C. wave passes between −6 volts and −3 volts, the pulse output, line C, drops to −12 volts and the pulse, line B, goes to 0 volts to indicate an output in the $2^0$ order.

As the A.C. wave moves between −3 volts and 0 volts, both waveforms, line B and line C, drop to 0 volts, and the output is 0 for the $2^0$ and $2^1$ order. As the wave passes again between −3 volts and −6 volts, the waveform, line B, rises to 0 volts for a 1 indication while the waveform, line C, indicative of the first order place in binary, stays at 0.

As the A.C. wave passes between −6 volts and −9 volts, the waveform, line C, rises while the waveform, line B, drops to indivate 10 in binary or 2 in decimal.

When the A.C. wave drops between −9 volts and −12 volts, both waveforms, lines B and C, are up to give a binary indication of 11 or 3.

The apparatus shown in FIG. 1 is the simplest form of the present invention in that only two binary orders are to be indicated.

In essence, an analogue voltage is applied at 14. Voltage responsive devices for each binary order are set to conduct upon the input analogue reaching a given magnitude to provide an output at 40 for the binary order $2^0$ and an output at 44 for the binary order $2^1$. In order to provide a proper binary output under all conditions, the $2^0$ stage must also be conditioned to conduct for the input analogue to which a binary output at the $2^0$ order is desired when any higher order is indicating a binary 1. This is the function of the feedback connection from the $2^1$ order at the output 44 to the $2^0$ order by means of transistor 46.

Thus the $2^0$ state responds to a magnitude of input analogue represented by 01 and will be set by the feedback connection to respond to an input analogue 11.

In a like manner, for example, a three binary output device having three input responsive devices which by its bias will respond to an input analogue to indicate three magnitudes of input must have one feedback connection from the highest order $2^2$ to the next lowest order $2^1$. For the lowest order, 20, there must be one feedback connection each from the $2^1$ and $2^2$ order and one combined output from both the $2^1$ and $2^2$ order.

By varying the voltages applied during feedback, the input analogue can be converted into any binary function whether arithmetic, geometric, or logarithmic merely by changing these voltages.

In the following example, the binary number output increases with increase in negative voltage. If an increase is desired for positive voltage, the signs of all voltages are changed and opposite transistor types are used. The transistor 10 does not form a portion of the present invention and is merely an impedance source for the input signal applied on base 12.

The voltage $E_{IN}$ appearing at terminal 14 is connected to the emitter of two NPN transistors 16 and 18. Each NPN transistor 16 and 18 is biased by means of a voltage divider 20 connected between ground 22 and a −12 volt potential 24. The voltage divider 20 is shown consisting of a series of resistors 26, 28, 30 and 32, all of equal magnitudes so that the space points between the resistors have constant differences in voltage. As shown with the potentials of ground and −12 volts, the voltage at the terminal between resistors 26 and 28 is −3 volts, the voltage at terminal 29 is −6 volts and the voltage at terminal 31 is −6 volts.

Consider first the transistor 16 which is biased through the base connected by a voltage of −3. When the voltage at the emitter of transistor 16 is more negative than −3 volts, that is, −3 to −6, the base-emitter connection will conduct current and the collector voltage will drop to a minus value as determined by the voltage then being applied to the emitter. This negative voltage applied to a resistor 36 to the base of the transistor 38 causes conduction in this transistor 38. Normally the transistor 38 is biased to nonconduction by the +6 volt source applied to its base. When the transistor 38 is nonconducting, the output 40 of transistor 38 is at −12 volts. When the transistor 16 conducts, however, the transistor 38 conducts, and the voltage at the output 40 rises to ground potential to indicate a binary digit in the zero place of the binary order.

As the input analogue at 14 is between 0 and −3 volts, the transistor 16 and transistor 18 will not conduct, since the emitter voltage is less than the base voltage applied to either transistor 16 or transistor 18. In this case the transistors 38 and 42 will be nonconducting to indicate zero in the zero place and zero in the first order place of the binary number.

As the voltage $E_{IN}$ drops to a value betwen −6 volts and −9 volts, the transistor 18 will conduct current, and the transistor 42 will be biased to conduction, and the output 44 will rise to indicate a binary digit in the first order position of the binary number. As the output 44 rises, the transistor 46 is biased to conduction, and the voltage at the collector drops to −9 volts and biases transistor 16 through the diode 48 to approximately −9 volts. The input signal at terminal 14 between −6 and −9 volts which would normally render the transistor 16 conducting does not therefore in this case do so since the bias voltage to transistor 16 has been changed from −3 volts to −9 volts. Therefore, the output 40 of the zero order binary number is at a low level and indicates 0 so that the decimal indication is 2, as shown in FIG. 2 for this voltage variation.

As the voltage varies from −9 to −12 volts, the transistor 16 is rendered conducting by the fact that the voltage at the emitter is now more negative than the −9 volts which has been applied by means of transistor 46 to the base. The line 40 therefore rises and indicates a binary 1 at this place in the binary number for a decimal indication of 3 as shown by FIG. 2.

Thus FIG. 1 shows an analogue to binary conversion apparatus which gives a binary number output for each of four voltage increments. The basic circuit shown in FIG. 1 may be expanded. In general, the number of transistors required is equal to the number of voltage reference points plus the number of binary outputs. The number of voltage reference points equal the number of voltage ranges −1. This may be expressed as follows:

$$T=(R-1)+D$$

$T$=Number of transistors
$R$=Number of voltage ranges
$D$=Number of binary digits The voltage points of FIG. 2 are arithmetic since each is spaced an equal voltage increment apart. It is of course just as easy to set the voltage levels at 1 2 4 8 which would make the binary output a geometrical function of the input or set the voltage levels at 1 2.72 7.37 20.09 which would make the binary output the natural logarithmic function of the input.

When the input voltage is −9 volts or lower, the diode 48 decouples the 9 volt reference voltage from the transistor 16 and thus avoids excess loading effects. The series resistors in the base circuits of all transistors likewise limit the saturation current and so prevent overloading.

Figure 3:
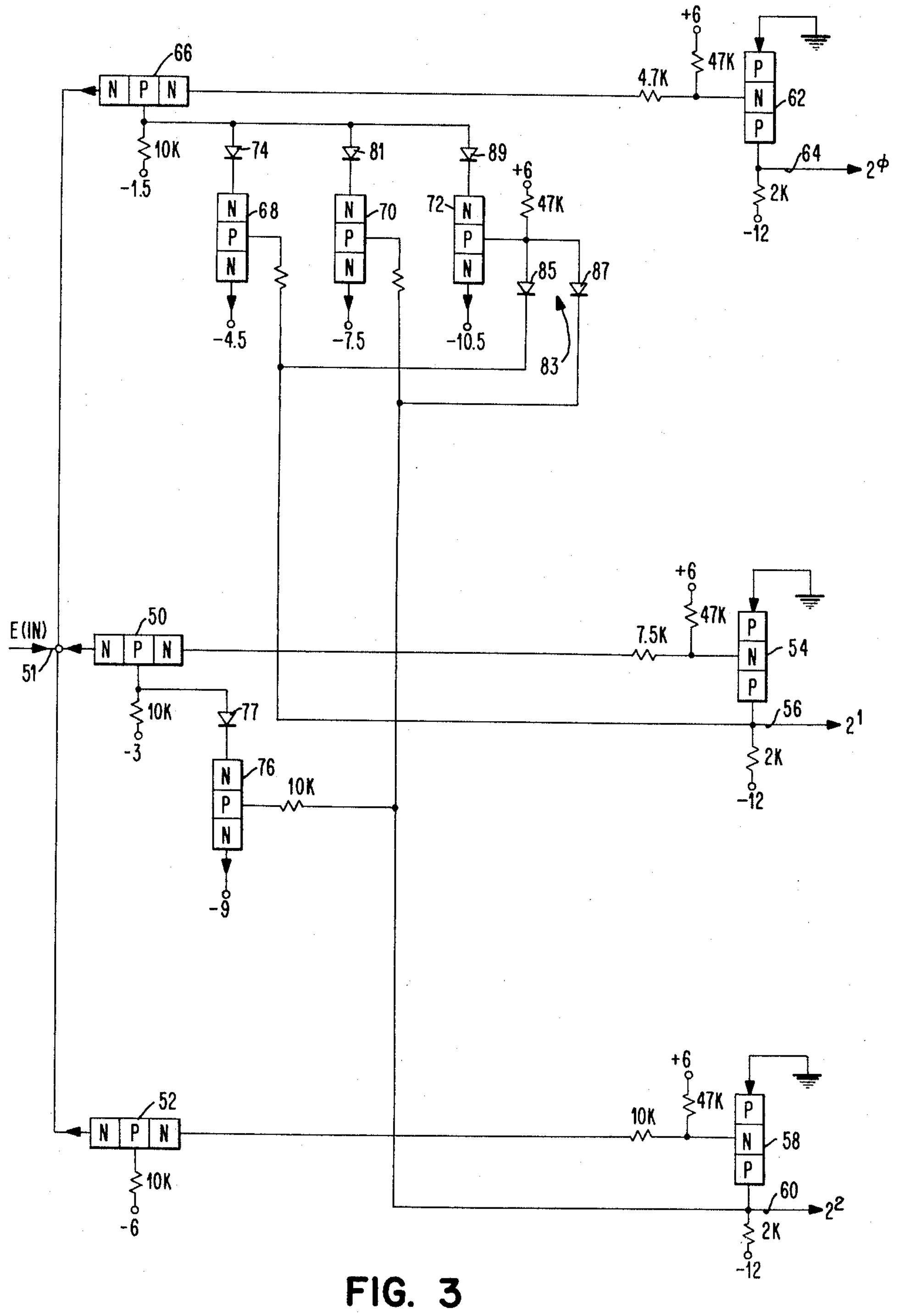
FIG. 3 is a circuit diagram of the analogue to binary conversion apparatus utilizing more than two outputs.

In FIG. 3, the circuit is designed to provide a 3 order binary number $2^0$, $2^1$, and $2^2$.

The input voltage wave at terminal 51 which for example may be considered the same as that shown for FIG. 2, will be digitized in accordance with the 1.5 voltage differentials in accordance with the following:

| Input | Binary output | | | Decimal |
|---|---|---|---|---|
| | $2^2$ | $2^1$ | $2^0$ | |
| −1.5 to zero | 0 | 0 | 0 | 0 |
| −3 to −1.5 | 0 | 0 | 1 | 1 |
| −4.5 to −3 | 0 | 1 | 0 | 2 |
| −6.0 to −4.5 | 0 | 1 | 1 | 3 |
| −7.5 to −6 | 1 | 0 | 0 | 4 |
| −7.0 to 7.5 | 1 | 0 | 1 | 5 |
| −10.5 to −9 | 1 | 1 | 0 | 6 |
| −10.5 up | 1 | 1 | 1 | 7 |

For voltages which are less than 1.5 volts, none of the transistors 50, 52 or 66 are rendered conducting so that the voltage at outputs 60, 56, and 64 is −12 volts and the binary number indication 000. As the voltage at the input 51 drops below −1.5 but greater than −3, the transistor 66 conducts and causes operation of the transistor 60 which raises the output 64 to a plus level of 0, and the indication now is 001.

As the voltage goes below −3 volts but greater than −1.5 volts, the transistor 50 will conduct, cause conduction in transistor 54 to raise the output 56 for a binary 1 and thus through the connection from the output 56 to the base of transistor 68 turn transistor 68 to an ON condition. The voltage at the collector of transistor 68 thereby drops to −4.5 volts and through the diode 74 applies this −4.5 volts to the base of transistor 66 and biases the same off.

Thus the voltage in the 0 place drops down to −12 volts, and the binary indication now is 010.

When the input drops to −4.5 volts, the transistor 66 turns on again, and the output 64 rises to give a binary indication of 011. When the input voltage drops to −6 volts to −9 volts, the transistor 52 turns ON which turns ON the transistor 58, raises the output 60 to a 1 indication which biases the transistor 76 to conduction which allows the −9 volt potential at the emitter of this transistor to appear at the collector of the same and to thus bias the transistor 50 through a diode 77 to −9 volts, whereby the transistor 50 cuts off and the output 56 drops to −12 volts.

The output 60 which is now at a raised voltage level biases a transistor 70 to conduction to allow the −7.5 volt potential at its emitter to appear at the collector and to be coupled to the transistor 66 through a diode 81 so that a potential at the input between −6 and −7.5 does not cause conduction in transistor 66 and the voltage out at 64 will be down and the binary indication will be 100 or the decimal equivalent of 4. As the voltage drops below −7.5 but greater than 9 volts, the transistor 66 which is biased by −7.5 volts conducts and the output 64 rises to give a binary indication of 1 so that the binary number appearing is 101 which is the decimal 5.

When the input voltage at 51 drops below −9 volts, the transistor 50 which is biased by the −9 volts applied to transistor 76 conducts turning ON the transistor 54 and raises the output 56 to a high level voltage which is applied to the transistor 68. The voltages applied to the transistor 68 and transistor 70 to the base thereof particularly are also provided to an AND circuit 83 consisting of diodes 85 and 87 which when both input lines are at a raised level will raise the potential at the base of the transistor 72 and cause conduction therein. This is the present condition and allows the voltage at the emitter of transistor 72 which is −10.5 volts to appear at the collector and through the diode 89 to be applied to the base of transistor 66, thereby preventing transistor 66 from conducting with the voltage between −9 and −10.5 volts.

As the voltage at the input drops below −10.5 volts, the transistor 66 will conduct, and the indication on output 64, 56 and 60 will be raised to indicate 111 which is the decimal equivalent of 7.

The pattern is now established for expanding to higher orders of numbers; for example, 16 voltage increments would require 4 binary digits. The circuitry for the $2^1$ power, $2^2$ power and $2^3$ power would be the same as that shown in FIG. 3. The $2^0$ order would consist of 9 transistors, an NPN input, PNP output, and 7 NPN bias control transistors arranged to operate from all combinations of $2^1$,$2^2$, and $2^3$. This is a total of 19 transistors which checks the formula given before. The voltages shown in FIG. 3 are shown simply as emanating from a power supply or a voltage divider network as specified in FIG. 1.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An analogue to binary conversion apparatus comprising:

(a) an input to which an analogue voltage is applied;

(b) a plurality of NPN output transistors having their emitter directly connected to said input, each having an output from their collector representing an order of a binary series $2^0$, $2^1$, . . . $2^n$ and each being controled to represent a "0" or "1" in said order represented;

(c) means for biasing the base of each NPN output transistor whereby the output of each represents a zero in its corresponding order, said biasing means for each output transistor being of a magnitude proportional to the order of said output transistor;

(d) transistor switching devices connected in shunt relation to each biasing means wherein each output transistor has $2^{n-k}-1$ switching transistors where $n$ is binary order and $k$ is the order of said output transistor;

(e) a source of voltage connected to each switching transistor the magnitude of which is equal to the sum of the bias voltage of the associated transistor plus the magnitude of the bias voltage of a higher order output transistor;

(f) means for connecting one switching transistor associated with each output transistor to the output of each higher order output transistor whereby the switching transistor will establish its associated source of voltage at its associated output transistor when said higher order output transistor indicates a binary "1";

(g) a combination switching transistor for each output transistor at least two orders lower than the highest binary order represented by said series of output transistors; and (h) means connected to said combination switching transistor and responsive to combinations of higher order representative of binary 1 to bias said combination transistor to conduction whereby the magnitude of said input analogue is converted to a binary indication representative of the magnitude at the outputs of said output transistors.

2. The apparatus of claim 1 wherein each said transistor switching device includes a diode in its collector circuit.

References Cited by the Examiner

UNITED STATES PATENTS

| | | | |
|---|---|---|---|
| 2,869,079 | 1/59 | Staffin et al. | 340—347.1 X |
| 2,922,151 | 1/60 | Reiling | 307—88.5-3 |

MALCOLM A. MORRISON, *Primary Examiner.*